UNITED STATES PATENT OFFICE.

ADRIAN VAN BERKEL, OF BERLIN, GERMANY.

MANUFACTURE OF PLATES AND SLABS FOR BUILDING PURPOSES.

SPECIFICATION forming part of Letters Patent No. 431,429, dated July 1, 1890.

Application filed June 18, 1889. Serial No. 314,759. (No specimens.) Patented in Austria-Hungary May 7, 1888. No. 19,687 and No. 44,663, and in England May 9, 1888, No. 6,944.

*To all whom it may concern:*

Be it known that I, ADRIAN VAN BERKEL, of the city of Berlin, in the Kingdom of Prussia and German Empire, have invented a certain new and useful Improvement in the Manufacture of Plates and Slabs for Building and other Purposes, (for which I have obtained patents in Great Britain dated May 9, 1888, No. 6,944, and in Austria-Hungary dated May 7, 1888, No. 19,687 and No. 44,663,) of which the following is a specification.

This invention relates to the manufacture and composition of weather and fire proof plates or blocks intended more particularly for building, paving, roofing, and similar or other purposes; and its object is to obviate the inconveniences resulting from the use of similar plates prepared in accordance with the well-known method of Sorel, which consists, essentially, in combining chloride of magnesium with burned carbonate of magnesia, the said inconveniences to be obviated being that, by reason of the chloride of magnesium not combining sufficiently with the magnesia, the plates or blocks produced out of the said combination absorb the moisture of the atmosphere, and are thus rendered noxious to the inhabitants of the dwellings built with such plates, and, moreover, the latter become, after a certain length of time, softened by the moisture absorbed, and are thus destroyed.

According to this invention, in order to obviate the above difficulties and to prevent the magnesium from exuding from the plates or blocks to be produced, a water solution is made of fluoric silicate, and to one hundred parts, by weight, of this solution there is added a quantity of twenty to fifty parts, by weight, (more or less,) of vegetable flour—such as dextrine, potato-starch, rye, wheat, or any other suitable flour or pulverized magnesian marlstone—so as to form therewith an emulsion or thin pasty mass, to which the proper proportion (as hereinafter referred to) of burned carbonate of magnesia or magnesite is added after the said magnesia or magnesite have been mixed in a dry state with raw paper stuff—such as sawdust, triturated straw, or cork—or with peat or sand, or the like, in a similar proportion as has been described with reference to the said solution of chloride of magnesium and the vegetable flour or pulverized magnesian marlstone. The combined mass thus obtained is then well mixed by means of stirring, and thereupon kneaded thoroughly until it forms a thick paste, which then, according to the required form of the plates or other article to be shaped therefrom, is placed into suitable molds and subjected to hydraulic or other pressure.

In order to strengthen the plates to be produced, the paste described from which they are molded may inclose suitable textile fabrics—such as sackcloth and the like or reed-mat—inserted in the said paste in a well-known manner before the molding.

In the case of light plates being produced the insertion of braided reeds is preferred, the molded plates in such case not being subjected to pressure after the molding, and the paste from which they are molded may be less thick or dense than in those cases where pressure is applied to act upon the molds. It will be well understood that the relative density of the said paste depends on the proportion in which the said fluoric silicate has been mixed with the said vegetable flour or pulverized magnesian marlstone to form therewith an emulsion of a more or less pasty character, or on the proportion in which water is added to form the solution of said fluoric silicate, or on the proportion in which paper-pulp, sand, or other substance is added to form the dry mixture with the said burned carbonate of magnesia, which proportions may be varied readily by the operator, according to the special purpose which the plates or other articles to be produced are intended to serve, and according to the compactness they are desired to possess to be suited best for the said purpose.

In respect of the proper proportion hereinbefore referred to, in which the said emulsion containing the fluoric silicate is added to the dry mixture containing the burned carbonate of magnesia or magnesite, it is to be stated that I have found that as a rule fifty parts, by weight, of molten fluoric silicate transformed into an aqueous solution will combine with one hundred parts, by weight, of burned carbonate of magnesia; but since, in practice, the magnesia is rarely ever burned quite uniformly, and since, moreover, the native carbonate of magnesia often contains other foreign matter or substances, it will be necessary, to vary according to the circumstances in every particular case, the quantity of the fluoric silicate to be mixed and combined with the (one hundred parts of) carbonate of magnesia or magnesite. Thus, for instance, one hundred parts, by weight, of well-burned pure magnesia will form a combination with fifty to sixty parts, by weight, of fluoric silicate dissolved in water, while thirty to forty parts, by weight, only of said aqueous solution of fluoric silicate are required for combining with one hundred parts, by weight, of insufficiently-burned magnesia or of magnesite containing other component matter or foreign substances. This combination of fluoric silicate and burned carbonate of magnesia results in the production of silicate of magnesia which will produce a combination harder and more resistible than those heretofore in use, the proportions used and matter added remaining substantially the same as above described. In the same manner the said fluoric silicate will combine with the burned dolomite, which combination will likewise result in a most resistible and weather-proof product and consist of silicate of magnesia and fluoride of calcium.

In such rare cases where carbonate of magnesia may be had well burned and in a perfectly-pure state, free from any other combinations, it will combine with water the same as hydraulic mortar, and in such case the said burned magnesia in a dry state is thoroughly mixed with the said paper stuff, peat, sand, or other matter, as hereinbefore set forth, and a sufficient quantity of water being added to said mixture the latter is kneaded to form a thick or dense paste, which is then molded and treated in the same manner as above described.

Having fully described my invention, what I desire to claim and secure by Letters Patent is—

A compound for the manufacture of plates or blocks consisting of burned carbonate of magnesia or magnesite, raw paper stuff, peat, sand, or other finely-divided material, and a solution of fluoric silicate containing vegetable flour, substantially as described.

In testimony whereof I have signed my name to this specification in the presence of two subscribing witnesses.

ADRIAN VAN BERKEL.

Witnesses:
 CHAPMAN COLEMAN,
 EMIL KOLLINER.